United States Patent [19]
Mitchell et al.

[11] Patent Number: 4,558,370
[45] Date of Patent: Dec. 10, 1985

[54] IMAGE PROCESSING METHOD FOR GRAPHICS IMAGES

[75] Inventors: Joan L. Mitchell, Ossining; William B. Pennebaker, Carmel, both of N.Y.

[73] Assignee: International Business Machines Corporation, Armonk, N.Y.

[21] Appl. No.: 553,216

[22] Filed: Nov. 21, 1983

[51] Int. Cl.$^4$ .................. H04N 1/40; G09G 1/14; G09G 3/00; G06K 9/36
[52] U.S. Cl. .................. 358/260; 358/262; 382/56; 340/744; 340/793
[58] Field of Search ............ 358/280, 283, 260, 262, 358/166, 284; 382/50, 52, 56; 340/793, 728, 744, 747, 722

[56] References Cited

U.S. PATENT DOCUMENTS

| | | | |
|---|---|---|---|
| 4,006,298 | 2/1977 | Fowler et al. | 350/240 |
| 4,177,470 | 12/1979 | Durrum | 346/139 R |
| 4,205,341 | 5/1980 | Mitsuya et al. | 358/284 |
| 4,210,936 | 7/1980 | Cinque | 358/283 |
| 4,229,768 | 10/1980 | Kurahayashi | 358/261 |
| 4,258,394 | 3/1981 | Kennedy | 358/284 |
| 4,280,144 | 7/1981 | Bacon | 358/280 |
| 4,315,285 | 2/1982 | Sommer et al. | 358/284 |
| 4,468,705 | 8/1984 | Burton | 358/166 |
| 4,532,503 | 7/1985 | Pennebaker | 340/728 |
| 4,532,651 | 7/1985 | Pennebaker | 382/54 |

Primary Examiner—Howard W. Britton
Assistant Examiner—John K. Peng
Attorney, Agent, or Firm—George E. Clark; Thomas P. Dowd

[57] ABSTRACT

Graphics images are generally considered to be those images comprised of text and/or line drawings. Data compression of graphics images is desired whenever a fast image transmission speed is desired in a limited band width channel. It is also used for storage of a large number of images in a limited capacity storage system. The method and apparatus described herein improves data compression, resolution and coding efficiency by eliminating transitions between gray levels at edges in an image, converting all gray levels to a common value to achieve a 3 level representation of a graphics image, and reversibly converting the 3 level representation to a bilevel double resolution representation by increasing the data sampling rate and therefore allowing the use of two level data compression techniques. A high resolution display or printed output may be obtained from the bilevel multiresolution representation.

20 Claims, 9 Drawing Figures

CHANGE $p_c \rightarrow 11$

IF $p_c$ = GW    10
AND EITHER $p_p$ OR $p_n$ = GB    01
THEN FORCE $p_c$ = W    11

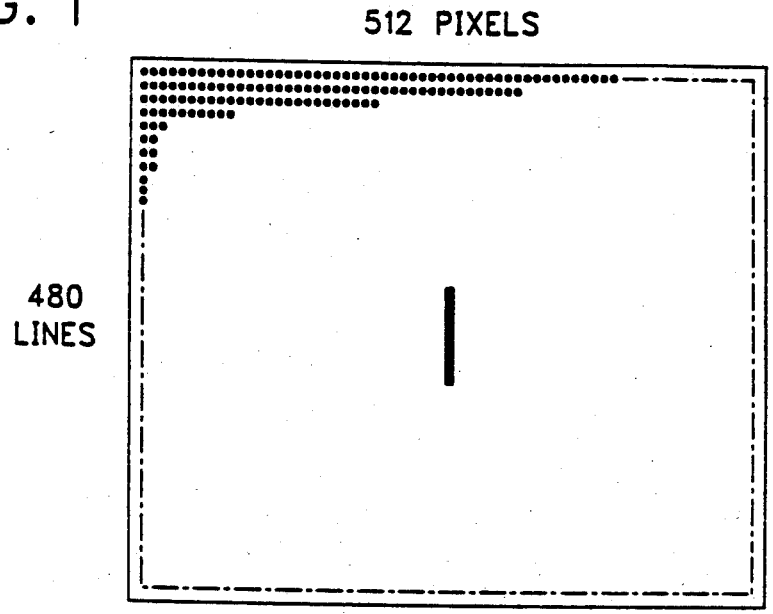

IMAGE PROCESSING METHOD FOR GRAPHICS IMAGES

BACKGROUND OF THE INVENTION

1. Field of the Invention

The present invention relates to image processing and more particularly to methods for processing of graphics image data which leads to improved compression, coding efficiency and resolution.

2. Description of the Prior Art

In the prior art there are many image processing systems. The following are systems representative of the prior art.

A paper by Spencer and Huang, presented at the Symposium on Computer Processing in Communications, Apr. 8-10, 1969, addresses the problem of transforming a gray scale image to an equivalent set of black/white images called bit planes. The paper does not show any method for modifying edge pixel values to improve compression.

U.S. Pat. No. 4,532,651 (Ser. No. 429,658) describes a filter for gray scale image data which forces the least significant bit of a current pixel equal to the most significant bit of the current pixel in a two bit per pixel representation when the most significant bit of a current pixel is equal to the most significant bit of a previous and a next pixel on the current scan line of an image. The method of this patent employs horizontal redundancy to filter all changes in second bit plane except for pixels adjacent to Black/White or White/Black changes in gray scale pixel values along a scan line. The patent does not shown any method for modifying edge pixel values of a graphics image to improve compression.

U.S. Pat. No. 4,532,503, (Ser. No. 440,114) describes a system which converts four level pixel intensity values to a sequence of three bilevel intensity values for each pixel in an image according to intensity values of neighbor pixels to increase display addressability and image resolution. The patent does not show a method for selectively modifying intermediate pixel values at edges in a graphics image to improve compression.

U.S. Pat. No. 4,546,385 (Ser. No. 509,837) describes data compression apparatus and method for separating a graphics image into at least first and second bit planes, identifying edge pixels from the first bit plane indicating a black/white change, locating the edge pixels and generating a single bit for each edge pixel indicating whether the edge pixel has a maximum intensity value such as black or white or an intermediate gray intensity value. Although the patent identifies edge pixels in an image, the patent does not show any method for modifying edge pixel values to improve compression.

An article in the IBM Technical Disclosure Bulletin, Vol. 22, No. 7, December 1979, at page 2980 and following shows a method for coding gray scale image data employing a vertical redundancy scheme. The publication shows a method for coding pixel values for gray level runs of pixels along a line by comparing the value on the current line to the value on the line above in the image. The article does not show a method for modifying edge pixel values in a graphics image to improve compression.

U.S. Pat. No. 4,006,298 generally discloses a system having an image gray scale using 64 discrete levels of brightness. The patent does not show a method for modifying edge pixel values in a graphics image to improve compression.

U.S. Pat. No. 4,177,470 shows a system wherein a binary data signal is operated on to reduce the number of bits in the signal without reducing information content of the signal. The patent shows basically a data compression system. The patent does not show a method for modifying edge pixel values in a graphics image to improve compression.

U.S. Pat. No. 4,210,936 shows a method and apparatus which achieves compression of image data by a reduction matrix which utilizes less gray scale data than is generated from the original picture element matrix. For example, if a picture element gray level required four bits of data, then the reproduction of the gray scale requires only one bit of data per pixel. The patent does not show a method for selectively modifying edge pixel values in a graphics image to improve compression.

U.S. Pat. No. 4,229,768 teaches an apparatus which compresses binary image signals by a selective run length compression technique. The patent does not show a method for modifying edge pixel values in a graphics image to improve compression.

U.S. Pat. No. 4,280,144 discloses apparatus and method for improving quality of a coarse scan, fine print image processing system. An encoder assigns a code to a coarsely scanned picture element representative of the reflectance characteristic thereof. For fine reproduction of coarsely scanned data, the coarsely scanned picture element is summed with at least four adjacent horizontal and vertical picture elements to reproduce a fine picture element comprising at least four sub-elements. Although the patent obtains information for determining a fine value of a particular picture element from adjacent picture elements, the patent in effect teaches a method for expanding data from a coarse scan to a fine representation. The patent does not show a method for modifying edge pixel values in a graphics image to improve compression.

The prior art discussed above does not teach nor suggest the present invention as disclosed and claimed herein.

SUMMARY OF THE INVENTION

Therefore, it is an object of the present invention to improve compression of graphics image data, by a method including the step of: changing an intensity value of any pixel having an intermediate intensity value within a first predetermined range of intermediate intensity values to a predetermined extreme intensity value if said pixel is adjacent to a pixel having a second intermediate intensity value within a second predetermined range of intensity values.

It is another object of the present invention to improve compression of graphics image data as above, by a method further including the step of: changing an intensity value of each pixel having one of a plurality of intermediate intensity values to one of a second plurality of predetermined intermediate intensity values.

It is another object of the present invention to improve compression of graphics image data and enhance image resolution, by a method further including the steps of: converting each representation of said predetermined intermediate intensity values to a plurality of representations of extreme intensity values in accordance with an intensity value of a preceding pixel; converting an original representation of each pixel having an extreme intensity value to a plurality of representations, each of said plurality of representations having an extreme intensity value corresponding to the original representation.

It is another object of the present invention to compress image data as above, by a method further including the step of: encoding intensity values of each picture element representation for storage or transmission of said image data.

It is another object of the present invention to print an improved resolution image, by a method further including the steps of: transmitting an image representation comprising a plurality of representations of extreme intensity value for each pixel to an output device; and printing a high resolution representation of said image.

It is another object of the present invention to compress image data as above, by a method further including the steps of: detecting all gray-white pixels adjacent to gray-black pixels; changing each gray-white representation at such detected gray-white pixels to a white representation.

It is another object of the present invention to compress image data as above, by a method further including the steps of: detecting each pixel having intermediate intensity values; and changing the value of each such detected pixel to a predetermined intensity value.

It is another object of the present invention to compress image data as above, by a method further including the steps of: multiplying the number of data samples taken in each clock cycle by a constant; generating for each data sample, an extreme intensity value determined by intensity values of a preceding pixel in said image to improve continuity of runs and thus encoding efficiency.

It is yet another object of the present invention to improve image resolution and compress image data, by apparatus including: means for storing a digital representation of an image; and means for changing an intensity value of any pixel in said image having an intermediate intensity value within a first predetermined range of intermediate intensity values to a predetermined extreme intensity value if said pixel is adjacent to a pixel having a second intermediate intensity value within a second predetermined range of intensity values.

It is yet another object of the present invention to improve image resolution and compress image data, by apparatus further including: means for changing an intensity value of each pixel having one of a first plurality of intermediate intensity values to one of a second plurality of intermediate intensity values.

It is yet another object of the present invention to improve image resolution and compress image data, by apparatus further including: means for converting each representation of said predetermined intermediate intensity values to a plurality of representations of extreme intensity values in accordance with an intensity value of a preceding pixel; means for converting an original representation of each pixel having an extreme intensity value to a plurality of representations, each of said plurality of representations having an extreme intensity value corresponding to the original representation.

It is yet another object of the present invention to compress image data, by apparatus further including: means for encoding intensity values of each picture element representation for storage or transmission of said image data.

It is yet another object of the present invention to improve image resolution and compress image data, by apparatus further including: means for transmitting an image representation comprising a plurality of representations of extreme intensity value for each pixel to an output device; and means for printing a high resolution representation of said image.

It is yet another object of the present invention to improve image resolution and compress image data, by apparatus further including: means for detecting all gray-white pixels adjacent to gray-black pixels; means for changing each gray-white representation at such detected gray-white pixel to a white representation.

It is yet another object of the present invention to improve image resolution and compress image data, by apparatus further including: means for multiplying the number of data samples taken in each clock cycle by a constant; means for generating for each data sample, an extreme intensity value determined by intensity values of a preceding pixel in said image to improve continuity of runs and thus encoding efficiency.

It is yet another object of the present invention to improve image resolution and compress image data, by apparatus further including: means for detecting each pixel having an intermediate intensity value; and means for changing the value of each such detected pixel to a predetermined intensity value.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 1 is a view of a typical image display.

FIG. 2 is a schematic representation of pixel values along a number of display lines of the image of FIG. 1 before application of the present invention.

FIG. 3 is a schematic representation of pixel values along a number of display lines of the image of FIG. 1 after application of the present invention.

In the drawing, like elements are designated with similar reference numbers, and identical elements in different specific embodiments are designated by identical reference numbers.

DESCRIPTION OF PREFERRED EMBODIMENTS OF THE INVENTION

Figure 4:
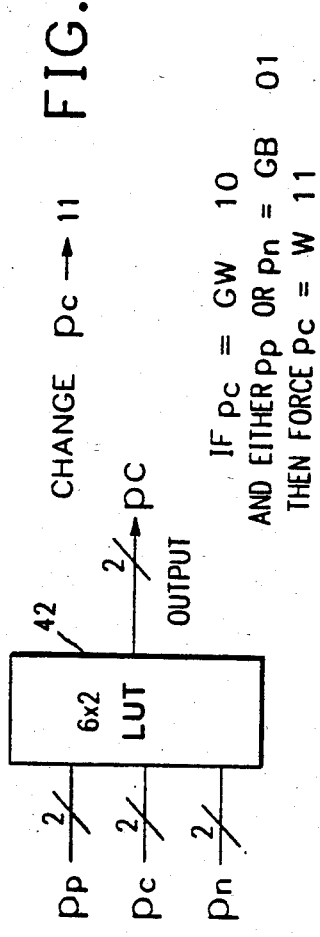
FIG. 4 is a logic diagram of a gray level sequence detector according to a first embodiment of the present invention.

The present invention relates to a novel method for improving compression and quality of graphics images for an image display system. In the prior art, there have been many methods set out for image processing and compression of graphics images. U.S. Pat. No. 4,532,651 (Ser. No. 429,658) describes a method for filtering a gray scale image to provide a two bit per pixel code which can represent four gray scale levels. These gray scale levels are shown in table I below:

TABLE I

| Gray Scale Value | | Binary Representation |
|---|---|---|
| Black | B | 00 |
| Gray-black | GB | 01 |
| Gray-white | GW | 10 |
| White | W | 11 |

The filter method of the patent guarantees that gray-white or gray-black pixels are found only at edges of black-white changes in the image. An edge is defined as a change in the most significant bit of horizontally adjacent pixels. Thus, a change between gray-white and gray-black is defined as an edge since there is a change in the most significant bit. Accordingly, a change between white and gray-white or between black and gray black is not defined as an edge because there is no change in the most significant bit. The filtered four gray level graphics image produced by the method and apparatus of the above-identified patent provide a starting point for the method and apparatus according to the present invention.

The method and apparatus according to the present invention further reduces information content of the second bit plane of the graphics image without significantly degrading image quality. This is accomplished through a transformation which removes a few gray pixels and remaps all remaining grays to a single intensity value. This produces images with at most one gray pixel at each transition instead of two.

The basic step of the method according to the present invention as implemented in the preferred embodiment thereof is as follows:

1. Convert any gray-white pixel adjacent to a gray-black pixel to white. This guarantees that there will be but one gray pixel per black/white transition.

In addition, the following steps provide further improvement to image compression, coding efficiency and resolution:

2. Convert all gray-white pixels and all gray-black pixels to a single gray level value.
3. Increase horizontal resolution by a factor of two and convert each three level pixel value into a pair of two level pixels.

The increased resolution image may be encoded for transmission or it may be displayed or printed on suitable output devices.

Table II below shows the conversion in context between a three level 512 pixel per line representation and a two level 1024 pixel per line representation.

TABLE II

| Three Level | | | | Two Level | | | |
|---|---|---|---|---|---|---|---|
| W | B | W | | WW | BB | WW | |
| B | W | B | | BB | WW | BB | |
| W | G | B | | WW | WB | BB | |
| B | G | W | | BB | BW | WW | |
| W | G | W | | WW | WB | WW | |
| B | G | B | | BB | BW | BB | |
| W | G | G | W | WW | WB | BW | WW |
| B | G | G | B | BB | BW | WB | BB |
| G | G | G | | not allowed removed by filter | | | |

It should be noted that the intermediate state identified as G (for gray) does not have a constant representation when converted from three level to two level. Gray translates to either a white-black pair or to a black-white pair depending upon horizontally adjacent pixel values. The two level representation of the gray value is dictated by continuity of runs and by a convention that runs ending odd end with a gray pixel when reconverted to the original representation. The third line of Table II above shows a transition from white to gray to black which is translated as follows: The white three level pixel becomes two white pixels; the gray pixel becomes two pixels having values of white,black; and the black pixel becomes two black pixels. The fourth line of Table II above shows a black, gray, white transition in which the gray pixel translates to a black,white pair. Once the image has been transformed to the two-level double resolution representation, it can be directly encoded by any black-white encoding method. One example of such an encoding method is the CCITT Group III modified READ algorithm. (R. Hunter and A. H. Robinson, "International digital facsimile coding standards", Proceedings of the IEEE 68, No. 7 pp 854–867 (July 1980).

The decoder converts the two-level double resolution representation to the three-level representation. Since the gray level states can be either BW or WB, both must be mapped to the same gray value in the display. TABLE III shows the decoded states:

TABLE III

| | binary value | |
|---|---|---|
| | 5 bit | 8 bit |
| Black | 00 | 00000000 |
| Gray | 01 | 01110000 |
| White | 11 | 11000000 |

Note that the 8 bit gray value has been chosen to be between the original gray-white and gray-black values.

Referring now to the drawing, FIG. 1 shows a typical image display having a horizontal resolution of 512 pixels per line and a vertical resolution of 480 lines. A vertical black area is shown near the center of the image which will be used as an example in a discussion of the apparatus and method according to the present invention.

FIGS. 2 and 3 depict the values of a sequence of pixels at the left and right edges of the black area shown in FIG. 1 where FIG. 2 represents pixel values before application of the steps of the present invention and FIG. 3 represents pixel values at the left and right edge of the black areas shown in FIG. 1 after all gray-white pixels immediately adjacent to gray-black pixels have been replaced by white pixels and all remaining gray pixels whether gray-white or gray-black have been set to a common value.

Figure 5:
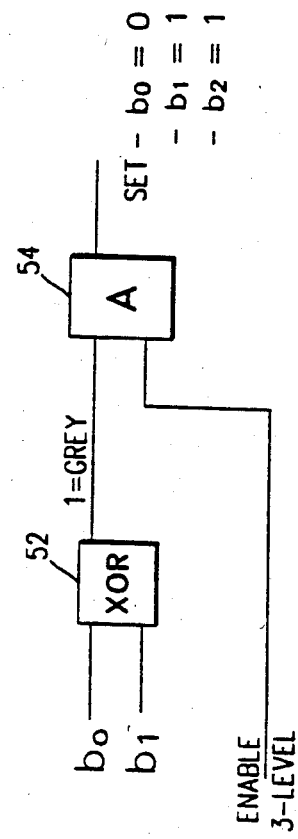
FIG. 5 is a logic diagram of a gray level comparison circuit according to a first embodiment of the present invention.

FIGS. 4, and 5 depict a logic implementation of the four level to three level conversion of the present invention according to a first embodiment thereof.

Referring now to FIG. 4 and Table IV below, logic for detecting a gray-white pixel adjacent to a gray-black pixel along a line will be described.

In the table the input and output values are broken down into states. Black (B) is 00, gray-black (GB) is 01, gray-white (GW) is 10, and white (W) is 11. The circuit shown in FIG. 4 employs a 6 bit input- 2 bit output lookup table circuit 42 to convert a GW pixel to W if either of its neighbors is GB. The four output states allowed are 0 (black), 1 (gray-black), 2 (gray-white), and 3 (white). The * marks the GW which were converted to W due to a GB neighbor. The table shows the transfer function to convert a GW next to a GB to a W. (Assumes earlier processing removed extra states.) The inputs to the lookup table are the 4 level 2 bit binary representations of Pp-the previous pixel, Pc-the current pixel, and Pn-the next pixel. The output of circuit 42 is the processed value of Pc-the current pixel in 2 bit representation.

TABLE IV

| Input states | | | Output state |
|---|---|---|---|
| Pn | Pc | Pp | Pc |
| X | B | X | B |
| X | W | X | W |
| X | GB | X | GB |
| X | GW | GB | W* |
| GB | GW | X | W* |
| B | GW | B | GW |
| B | GW | GW | GW |
| B | GW | W | GW |
| GW | GW | B | GW |
| GW | GW | GW | illegal |
| GW | GW | W | illegal |
| W | GW | B | GW |
| W | GW | GW | illegal |
| W | GW | W | illegal |

Three GBs or three GWs in a row are illegal combinations if previous processing was supposed to remove those states. Gray-whites between whites and/or gray-whites should have been removed by the speckle removal process described in U.S. Pat. No. 4,532,651 (Ser. No. 429,658). The same is true for gray-blacks between blacks and/or gray-blacks.

For the current discussion, the binary value assigned to a gray-white pixel is 10 and the value assigned to a gray-black pixel is 01, a white pixel is 11 and a black pixel is 00. Although lookup table circuit 42 has not been shown at the logic gate level, it is well within the skill of the art to implement lookup table 42 given the input and output values and the required transfer function as above.

After all gray-white pixels immediately adjacent to gray-black pixels have been forced to white, the remaining gray-white pixels may be either a single gray-white between any combination of extremes except two whites or a pair of gray-whites between two blacks, where black and white are defined as extreme values. The gray-black pixels may be either a single gray-black between any combination of extremes except two blacks or a pair of gray-blacks between two whites.

Referring now to FIG. 5, a logic circuit, according to a first embodiment of the present invention, for converting all remaining intermediate level (gray) pixels to a predetermined single gray level will be described. By convention, the bit structure for each pixel value is established as follows:

b0 is the most significant bit; b1 is the next most significant bit; and b2 is the least significant bit that are used to represent graphics pixels which have an intermediate value (gray).

In accordance with the bit structure established above, any gray pixel either gray-white or gray-black will have b1 different from b0. Therefore, gray pixels can be detected in exclusive OR 52 which produces an output signal when bits b0 and b1 are different. This output signal is in turn presented as an input to AND 54 which converts gray-white and gray-black to a single gray level when the enable line is raised. An output of AND 54 forces the bits of a gray pixel to be the following values b0=0; b1=1; and b2=1. This is the bit pattern selected for the common gray scale value after the four gray scale levels have been converted to three gray scale levels.

Figure 6:
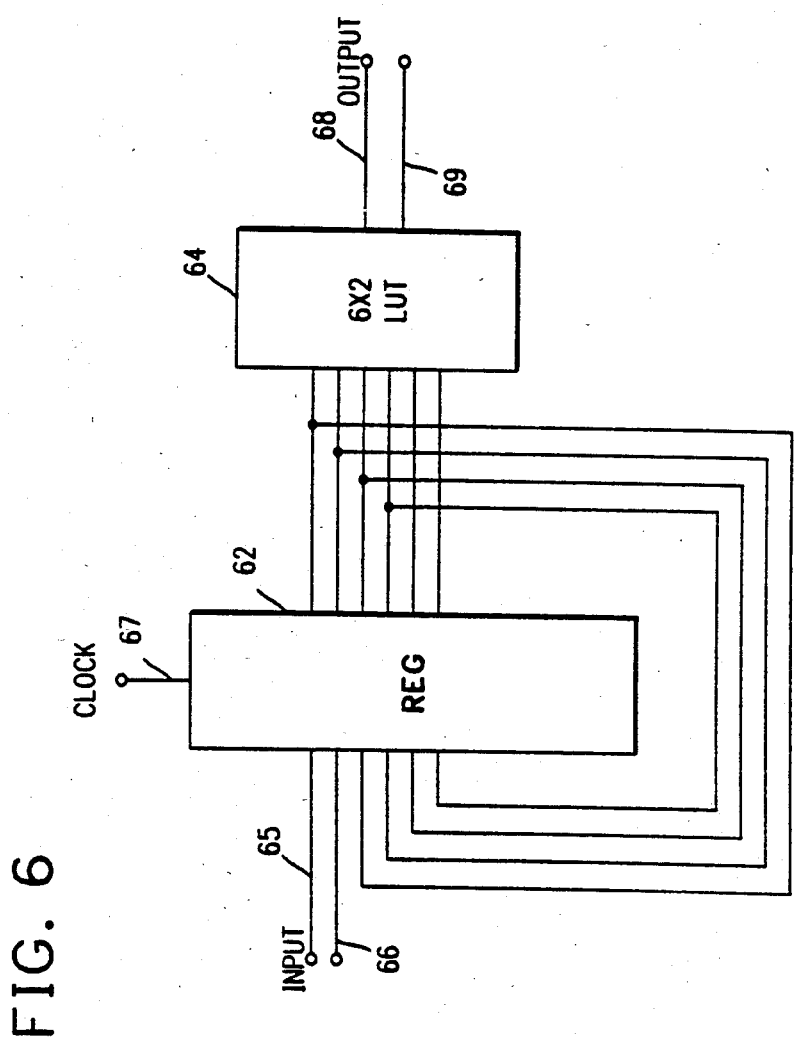
FIG. 6 is a logic diagram of a 4 level to 3 level translator according to a second embodiment of the present invention.

Referring now to FIG. 6, a second embodiment of a four level to three level conversion circuit will be described. Table V shown below is required for the register/lookup table embodiment of four to three level conversion. The circuit which implements this function is shown in FIG. 6. In table V the input and output values are broken down into states and binary representations. Black is 00, gray-black is 01, gray-white is 10, and white is 11. Note that all combinations are allowed for the pixel and its nearest neighbors; the circuit implements both the 4 to 3 level conversion and the speckle removal filter. The outputs flagged with an asterisk * have undergone speckle removal. These outputs flagged with a double asterisk ** are GW pixels which have been changed to W because of an adjacent GB pixel. The three output states allowed are 0 (black), 1 (gray) and 3 (white). An output value of 2 cannot occur.

TABLE V

| | Input | | | | | | Output | | |
|---|---|---|---|---|---|---|---|---|---|
| value | states | | | bits | | | value | state | bits |
| 0 | B | B | B | 00 | 00 | 00 | 0 | B | 00 |
| 1 | B | B | GB | 00 | 00 | 01 | 0 | B | 00 |
| 2 | B | B | GW | 00 | 00 | 10 | 0 | B | 00 |
| 3 | B | B | W | 00 | 00 | 11 | 0 | B | 00 |
| 4 | B | GB | B | 00 | 01 | 00 | 0 | B | 00* |
| 5 | B | GB | GB | 00 | 01 | 01 | 0 | B | 00* |
| 6 | B | GB | GW | 00 | 01 | 10 | 1 | G | 01 |
| 7 | B | GB | W | 00 | 01 | 11 | 1 | G | 01 |
| 8 | B | GW | B | 00 | 10 | 00 | 1 | G | 01 |
| 9 | B | GW | GB | 00 | 10 | 01 | 3 | W | 11** |
| 10 | B | GW | GW | 00 | 10 | 10 | 1 | G | 01 |
| 11 | B | GW | W | 00 | 10 | 11 | 1 | G | 01 |
| 12 | B | W | B | 00 | 11 | 00 | 3 | W | 11 |
| 13 | B | W | GB | 00 | 11 | 01 | 3 | W | 11 |
| 14 | B | W | GW | 00 | 11 | 10 | 3 | W | 11 |
| 15 | B | W | W | 00 | 11 | 11 | 3 | W | 11 |
| 16 | GB | B | B | 01 | 00 | 00 | 0 | B | 00 |
| 17 | GB | B | GB | 01 | 00 | 01 | 0 | B | 00 |
| 18 | GB | B | GW | 01 | 00 | 10 | 0 | B | 00 |
| 19 | GB | B | W | 01 | 00 | 11 | 0 | B | 00 |
| 20 | GB | GB | B | 01 | 01 | 00 | 0 | B | 00* |
| 21 | GB | GB | GB | 01 | 01 | 01 | 0 | B | 00* |
| 22 | GB | GB | GW | 01 | 01 | 10 | 1 | G | 01 |
| 23 | GB | GB | W | 01 | 01 | 11 | 1 | G | 01 |
| 24 | GB | GW | B | 01 | 10 | 00 | 3 | W | 11** |
| 25 | GB | GW | GB | 01 | 10 | 01 | 3 | W | 11** |
| 26 | GB | GW | GW | 01 | 10 | 10 | 3 | W | 11** |
| 27 | GB | GW | W | 01 | 10 | 11 | 3 | W | 11** |
| 28 | GB | W | B | 01 | 11 | 00 | 3 | W | 11 |
| 29 | GB | W | GB | 01 | 11 | 01 | 3 | W | 11 |
| 30 | GB | W | GW | 01 | 11 | 10 | 3 | W | 11 |
| 31 | GB | W | W | 01 | 11 | 11 | 3 | W | 11 |
| 32 | GW | B | B | 10 | 00 | 00 | 0 | B | 00 |
| 33 | GW | B | GB | 10 | 00 | 01 | 0 | B | 00 |
| 34 | GW | B | GW | 10 | 00 | 10 | 0 | B | 00 |
| 35 | GW | B | W | 10 | 00 | 11 | 0 | B | 00 |
| 36 | GW | GB | B | 10 | 01 | 00 | 1 | G | 01 |
| 37 | GW | GB | GB | 10 | 01 | 01 | 1 | G | 01 |
| 38 | GW | GB | GW | 10 | 01 | 10 | 1 | G | 01 |
| 39 | GW | GB | W | 10 | 01 | 11 | 1 | G | 01 |
| 40 | GW | GW | B | 10 | 10 | 00 | 1 | G | 01 |
| 41 | GW | GW | GB | 10 | 10 | 01 | 3 | W | 11** |
| 42 | GW | GW | GW | 10 | 10 | 10 | 3 | W | 11* |
| 43 | GW | GW | W | 10 | 10 | 11 | 3 | W | 11* |
| 44 | GW | W | B | 10 | 11 | 00 | 3 | W | 11 |
| 45 | GW | W | GB | 10 | 11 | 01 | 3 | W | 11 |
| 46 | GW | W | GW | 10 | 11 | 10 | 3 | W | 11 |
| 47 | GW | W | W | 10 | 11 | 11 | 3 | W | 11 |
| 48 | W | B | B | 11 | 00 | 00 | 0 | B | 00 |

TABLE V-continued

| Input | | | | | | | Output | | |
|---|---|---|---|---|---|---|---|---|---|
| value | states | | | bits | | | value | state | bits |
| 49 | W | B | GB | 11 | 00 | 01 | 0 | B | 00 |
| 50 | W | B | GW | 11 | 00 | 10 | 0 | B | 00 |
| 51 | W | B | W | 11 | 00 | 11 | 0 | B | 00 |
| 52 | W | GB | B | 11 | 01 | 00 | 1 | G | 01 |
| 53 | W | GB | GB | 11 | 01 | 01 | 1 | G | 01 |
| 54 | W | GB | GW | 11 | 01 | 10 | 1 | G | 01 |
| 55 | W | GB | W | 11 | 01 | 11 | 1 | G | 01 |
| 56 | W | GW | B | 11 | 10 | 00 | 1 | G | 01 |
| 57 | W | GW | GB | 11 | 10 | 01 | 3 | W | 11** |
| 58 | W | GW | GW | 11 | 10 | 10 | 3 | W | 11* |
| 59 | W | GW | W | 11 | 10 | 11 | 3 | W | 11* |
| 60 | W | W | B | 11 | 11 | 00 | 3 | W | 11 |
| 61 | W | W | GB | 11 | 11 | 01 | 3 | W | 11 |
| 62 | W | W | GW | 11 | 11 | 10 | 3 | W | 11 |
| 63 | W | W | W | 11 | 11 | 11 | 3 | W | 11 |

Register 62 stores the 2 most significant bits of the 2 previous pixels which are taken from outputs of register 62 on previous cycles. The 2 most significant bits of the current pixel are input to reg 62 on lines 65 and 66 respectively. Output from reg 62 to Look up table 64 is clocked by clock signal on line 67. The six input lines to Look up table 64 represent the 2 most significant bits of three consecutive pixels from which a three level binary representation for the middle pixel is obtained in accordance with the transfer function shown in table V.

Figure 7:
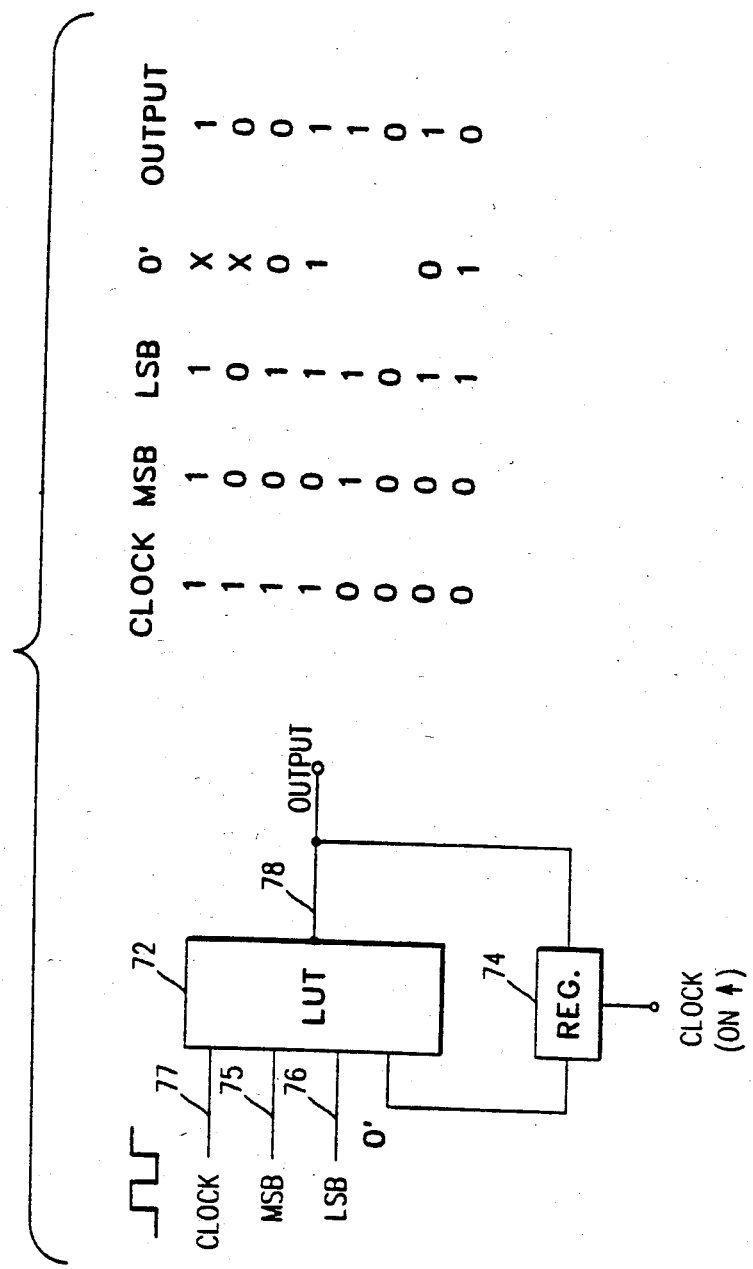
FIG. 7 is a logic diagram of a digital resolution enhancement translator circuit according to the present invention.

Referring now to FIG. 7, a circuit for expanding resolution by an integral factor will be described with reference to a preferred embodiment of the present invention. As indicated above with reference to TABLE II, each of the pixels in a three level gray scale representation will be changed to a pair of pixels in a two-level gray scale representation where gray pixels will be either a white-black or black-white pair depending upon the neighbor pixels.

Look Up table circuit 72 provides the transfer function shown in the table accompanying the circuit in FIG. 7. Register 74 provides inverse feedback of previous bit output to an input of LUT 72, transferred on each positive transition of the clock. The most significant bit (msb) of the current pixel is input to LUT 72 on line 75 and the least significant bit (lsb) is input on line 76. The clock is provided on line 77. If the msb equals the lsb, the output of LUT 72 equals the msb. If msb=0 and lsb=1 and clock is high, output 78=0'. If msb=0 and lsb=1 and clock is low, output 78=the inverse of 0'.

For each cycle of clock signal which appears on line 77, a pair of bits will be output on line 78, a first bit during the first half cycle of the clock when the clock is high and a second bit during the second half cycle of the clock when the clock is low as is shown in the table of FIG. 7. For example, if when the clock is high a white bit in three level representation having a binary pattern of 11 appears on lines 75 and 76, output 78 equals 1. During the second half cycle of the clock when the clock is low, the second bit of the bit pair will be generated also equal to 1 so that a three-level representation of a white pixel having a binary pattern of 11 will be transformed into a pair of two level representations in sequence being the pattern 11 as described.

If during the first clock half cycle lines 75 and 76 show a pattern of 00, the output will be 0 during the first half cycle and similarly when the clock is low output 78 will be 0 since a black pixel will translate to a pair of 0 bits in sequence.

If, however, a gray pixel having a three-level binary representation of 0 in the most significant bit and 1 in the least significant bit should appear on inputs 75 and 76, output 78 is determined by the value of the previous pixel. Thus, if a gray pixel follows a black pixel and the previous bit 0' equals 0, output 78 will equal 0 in the first half cycle when the clock is high and 1 in the second half cycle when the clock is low. Therefore, a gray pixel following a black pixel will have a 01 bit pattern. Similarly, if the previous pixel is a white pixel, 0' equals 1 and the output 78 during the high half cycle of the clock equals 1 and during the low half cycle of the clock equals 0. Thus, it can be seen that a gray pixel is transformed into a black-white or white-black pair depending upon the value of the previous pixel.

The remapping from three-level representation to two-level double resolution representation as was discussed above with reference to FIG. 7, facilitates run length coding of the binary represented image by insuring that the first bit of any pair representing a gray pixel will at least match the previous pixel pair to provide a longer run by at least one bit to improve encoding efficiency and reduce the number of runs.

Although the embodiment shown with respect to FIG. 7 above contemplates a doubling of resolution, other multiples of resolution may be achieved by employing appropriate clock frequencies and look-up tables.

Figure 8:
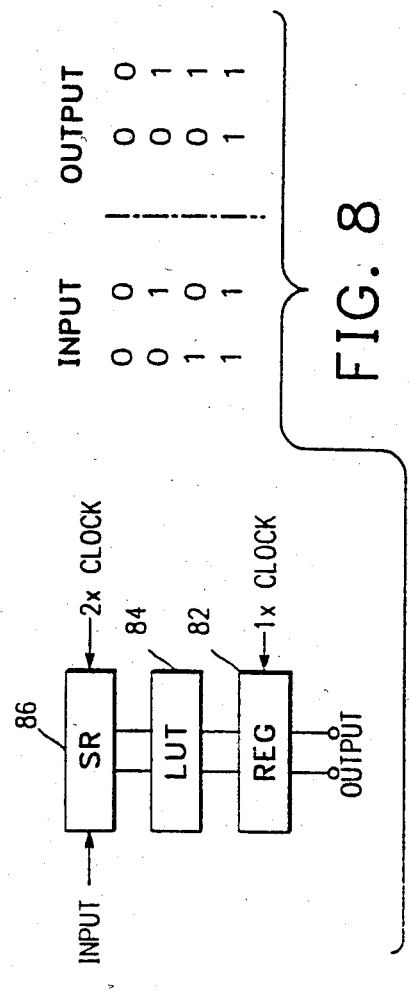
FIG. 8 is a logic diagram of a resolution enhancement recovery circuit according to a preferred embodiment of the present invention.

The encoded image which is created from the double resolution representation generated by the circuit shown in FIG. 7 is then stored or transmitted to a remote location where it is decoded. The processed original image can then be recaptured through circuits such as shown in FIG. 8 for double resolution or FIG. 9 for a triple resolution (a three bit sequence for each pixel). The encoded image can also be displayed or printed at the higher resolution if the display device or printer is capable of such resolution.

Referring now to FIG. 8, the recapture of the original image will be described. A serial data stream is input to shift register 86 where it is gated at a double clock rate to look-up table 84. Look-up table provides the transfer function shown in the table of FIG. 8 which generates a three-level binary representation for each pair of input bits representing a pixel. The output of look-up table 84 is connected to register 82 from whence the three level pixel representation is gated out by a clock signal at the original clocking frequency.

Figure 9:
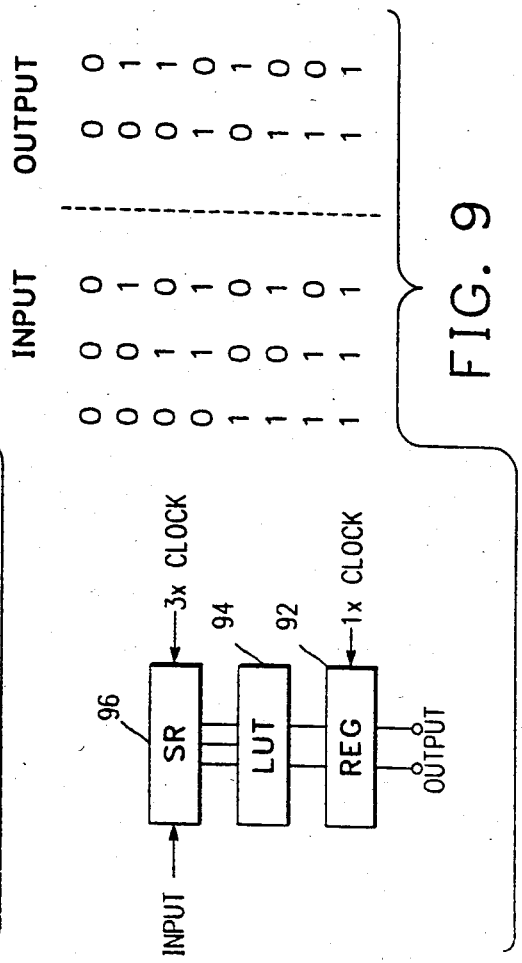
FIG. 9 is a logic diagram of a resolution enhancement recovery circuit according to an alternate embodiment of the present invention.

Referring now to FIG. 9, a similar circuit will be described with respect to an embodiment wherein three bits represent each pixel in a triple resolution embodiment. As before, the input data is shifted into a shift register 96 where it is gated under the control of a clock operating at three times the normal clock rate. Three bits are input to look-up table 94 which provides a two-bit four level representation for each pixel as an output which is connected to register 92 from which the output is gated at the normal clock rate. The table of FIG. 9 shows the four level output from register 92 for the various combinations of triple representation inputs fed serially to shift register 96.

The method and apparatus of preferred embodiments of the present invention described above provide improved image data compression, coding efficiency and display quality of graphics images.

Thus, while the invention has been described with reference to preferred embodiments thereof, it will be understood by those skilled in the art that various changes in form and details may be made without departing from the scope of the invention.

What is claimed is:

1. In a method for converting a graphics image into data representing the intensity values of the image pixels in binary format as either of two extreme values, e.g., black and white, as well as intermediate intensity values between said two extreme values, e.g., grays, to achieve efficient compression, resolution, and coding, the improvement comprising the step of: changing the intensity value of each pixel having an intermediate intensity value within a first predetermined range of said intermediate intensity values to a predetermined one of said extreme intensity values if said pixel is adjacent to a pixel having an intermediate intensity value within a second predetermined range of said intermediate intensity values.

2. A method according to claim 1, wherein pixels within said first predetermined range of intermediate intensity values are gray-white and pixels within said second range of intermediate intensity values are gray-black, and further comprising the steps of: detecting all gray-white pixels adjacent to gray-black pixels; and changing the intensity value of each such gray-white pixel to white.

3. A method according to claim 1, comprising the further step of: changing the intensity values of all pixels having intensity values among a first plurality of intermediate intensity values to a value among a second plurality of fewer intermediate intensity values.

4. A method according to claim 1, further comprising the step of: changing the intensity value of each pixel having an intermediate intensity value to a common predetermined intermediate intensity value.

5. A method according to claim 4 wherein said changing step comprises the use of a lookup table.

6. A method according to claim 1, further comprising the steps of: converting each representation of a pixel having an intermediate intensity value to a plurality of representations of extreme intensity values in accordance with the intensity values of its adjacent pixels; and converting an original representation of each pixel having an extreme intensity value to a plurality of representations, each of said plurality of representations having an extreme intensity value corresponding to the original representation.

7. A method according to claim 6 wherein said converting step comprises the use of a lookup table.

8. A method according to claim 6, comprising the further step of: encoding each of said pixel represntations for storage of said image data.

9. A method according to claim 6, further comprising the step of: encoding each of said pixel representations for transmission of said image data.

10. A method according to claim 9, further comprising the steps of: decoding said encoded representations; detecting each pixel having an intermediate intensity value; and changing the value of each such detected pixel to a predetermined intensity value.

11. Apparatus for improving image resolution and image data compression of a graphics image that has had the intensity values of its pixels converted into data in binary format as either of two extreme values, e.g., black and white, and intermediate intensity values, e.g., grays, comprising: means for storing said image data; and means for changing the intensity value of each pixel in said image having an intermediate intensity value within a first predetermined range of said intermediate intensity values to a predetermined one of said extreme intensity values if said pixel is adjacent to a pixel having an intermediate intensity value within a second predetermined range of said intermediate intensity range.

12. Apparatus according to claim 11, further comprising: means for changing the intensity value of each pixel having an intermediate intensity value to a common predetermined intermediate intensity value.

13. Apparatus according to claim 11, wherein pixels within said first predetermined range of intermediate intensity values are gray-white and pixels within said second range of intermediate intensity values are gray-black, and further comprising: means for detecting all gray-white pixels adjacent to gray-black pixels; and means for changing the intensity value of each such gray-white pixel to white.

14. Apparatus according to claim 11, further comprising: means for converting each representation of a pixel having an intermediate intensity value to a plurality of representations of extreme intensity values in accordance with the intensity values of its adjacent pixels; and means for converting an original representation of each pixel having an extreme intensity value to a plurality of representations, each of said plurality of representations having an extreme intensity value corresponding to the original representation.

15. Apparatus according to claim 14 wherein said converting means comprises a lookup table.

16. Apparatus according to claim 11, further comprising: means for encoding each of said pixel representations for transmission of said image data.

17. Apparatus according to claim 16, further comprising: means for decoding said encoded representations; means for detecting each pixel having an intermediate intensity value; and means for changing the value of each such detected pixel to a predetermined intensity value.

18. A method for graphics image processing to improve compression and resolution comprising the steps of: converting a graphics image into data in binary format representing the intensity values of the image pixels as either of two extreme values, black and white, or of two intermediate intensity values between said two extreme values, gray-black and gray-white; detecting all gray-white pixels adjacent to gray-black pixels in the image; and changing the intensity value of each such gray-white pixel to white.

19. A method as in claim 18, comprising the further steps of: changing the intensity values of all pixels having an intermediate intensity value to a common intermediate intensity representation, gray; converting each gray representation to a pair of extreme representations each in conformance with the representation of its adjacent extreme intensity value pixel; converting each extreme value pixel representation to a pair of identical extreme value representations; and encoding all of said pixel representations for the transmissions of said image data.

20. A method as in claim 19 wherein said converting steps comprise the use of a lookup table.

* * * * *